Feb. 14, 1967 W. R. HUTCHISON 3,304,113
INSTRUMENT FOR MANIPULATING CONTACT LENSES
Filed April 22, 1966 2 Sheets-Sheet 2
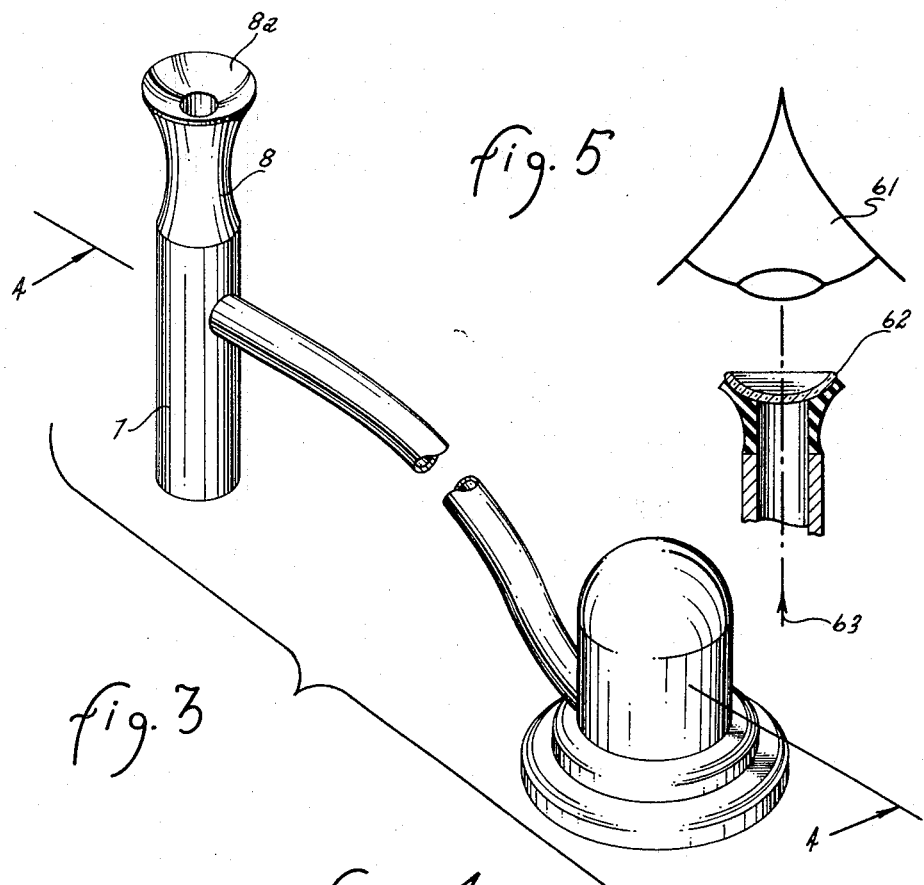
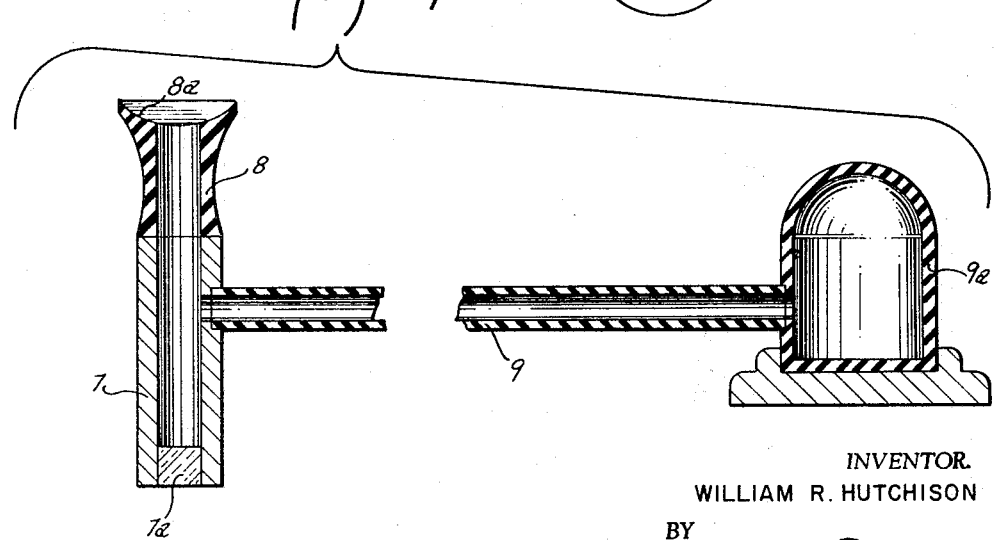
INVENTOR.
WILLIAM R. HUTCHISON
BY
William H. Drummond
ATTORNEY ns

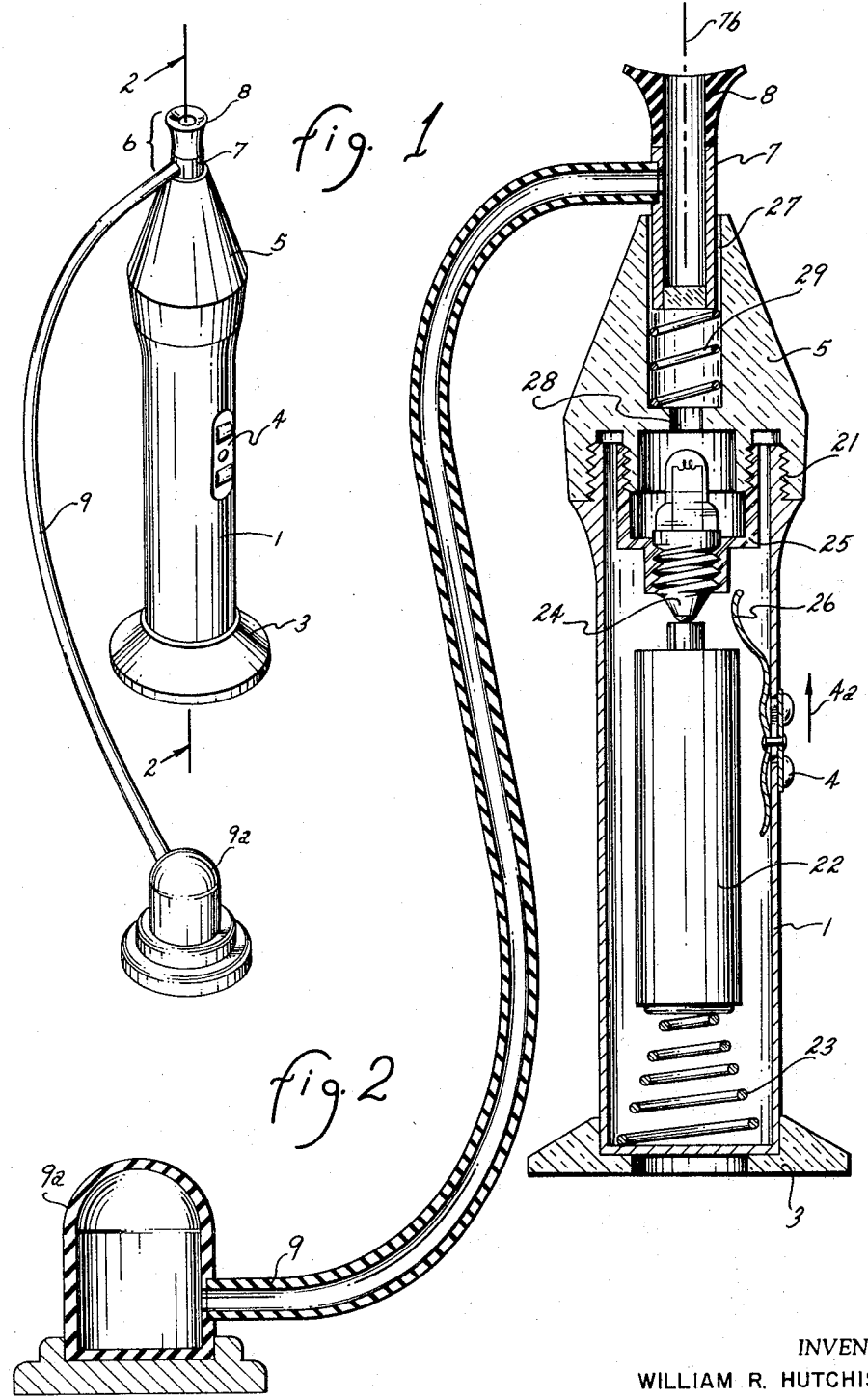

United States Patent Office 3,304,113
Patented Feb. 14, 1967

3,304,113
INSTRUMENT FOR MANIPULATING
CONTACT LENSES
William R. Hutchison, 10821 Fairway W.,
Sun City, Ariz. 85351
Filed Apr. 22, 1966, Ser. No. 544,584
3 Claims. (Cl. 294—64)

This invention relates to instruments for manipulating contact lenses.

More particularly, the invention concerns such an instrument which is especially adapted to remove contact lenses from the eye of the wearer.

In a further aspect, the invention relates to an improved instrument for manipulating contact lenses which minimizes the danger of injury to the eye of the wearer during insertion and removal of the lenses.

In a still further aspect, the invention concerns an improved instrument for manipulating contact lenses which minimizes the possibility of danger to or loss of the lenses during insertion or removal thereof from the eye of the wearer.

Many devices have been proposed to facilitate the insertion, removal and other manipulation of contact lenses. A particular instrument which employs a light source as a means for placing the lens upon the eye of the wearer with its optical axis coincident with the optical axis of the eye is described in the patent to Grabiel, U.S. 3,139,298. The present invention is an improvement on the general type of device described in the Grabiel patent, supra, and, more specifically, relates to improvements whereby such devices may be used to manipulate contact lenses with increased safety, convenience and reliability.

It is a principal object of the present invention to provide improvements in prior art contact lens manipulating devices whereby such devices can be used to remove a contact lens from the wearer's eye.

Another principal object of the invention is the provision of an improved instrument for manipulating contact lenses by which the removal of contact lenses can be accomplished with increased convenience.

A still further object of the invention is the provision of apparatus for the removal of contact lenses from the wearer's eye which facilitates the removal while minimizing the danger of damage to the wearer's eye and loss or damage to the contact lens.

Other, further, and more specific objects and advantages of the invention will be apparent to those skilled in the art from the following detailed description of the invention taken in conjunction with the drawings, in which:

FIG. 1 is a perspective view of a device which embodies the present invention;

FIG. 2 is a cross-sectional view of the device of FIG. 1 taken along section line 2—2 thereof;

FIG. 3 is a perspective view of the lens support portion of the device of FIG. 2;

FIG. 4 is a cross-sectional view of the apparatus of FIG. 3 taken along section line 4—4 thereof; and FIG. 5 is a schematic representation illustrating the use of the device of FIGS. 1–4 to either insert or remove a contact lens from the wearer's eye.

The prior art instrument of the general type described in the Grabiel patent, supra, comprises a tubular body portion having a light source disposed therewithin. The light is directed upwardly from the body portion through a hollow, generally cylindrical member. The contact lens is supported atop the hollow cylindrical member by a suitable cup-shaped support. In use, the lens is placed atop the cup-like support, the light source is activated and the wearer is enabled to accurately position the lens upon the eyeball by observing the light transmitted from the light source through the hollow cylindrical member and through the lens itself.

The present invention contemplates improvements in the above-described instrument comprising a novel cap member affixed to the upper end of the tubular body portion containing the light source and a lens support which is adapted to remove the contact lens from the eye, as well as insert the lens.

The cap member is affixed by suitable means, such as, for example, by threads, to the upper end of the body portion of the instrument and is provided with an axial lens support well. A light transmitting aperture communicates between the light source in the tubular member and the lens support well. This permits passage of light from the light source through the aperture and into the axial lens support well.

The lens support comprises a tubular member adapted to be inserted within the lens support well and extends upwardly therefrom. The upper end of the tubular support member is open and the lower end is closed by a light transmitting plug or cap. A resilient cup member is affixed to the upper end of the tubular support. The cup member, opening upwardly, is adapted to engage a contact lens along its periphery and has a central aperture communicating with the interior of the tubular support. The lens support also includes means for creating a partial vacuum within the tubular support after a contact lens is sealingly engaged by the periphery of the cup member.

In a preferred embodiment of the invention, the partial vacuum within the tubular support is created by a simple squeeze bulb connected by means of a suitable conduit with the interior of the tubular support.

In a further preferred embodiment of the invention, I provide a compression spring disposed within the lens support well. This spring is adapted to urge the lens support upwardly but is compressible such that the lens support yields downwardly when engaged with a contact lens positioned upon the eyeball. In this way, the likelihood of injury to the eyeball is minimized.

Referring now to the drawings, in which presently preferred embodiments of the invention chosen for purposes of illustration are depicted, FIG. 1 illustrates a device embodying the features of the present invention. The device comprises a tubular body portion 1 having a flared lower end 3 which functions as a base or stand for the device, a switch 4 for activating the light source, and a cap member 5 which receives, supports and positions the lens support (generally indicated by reference numeral 6) which includes a tubular support 7 received in the cap member 5 and extending upwardly therefrom and a resilient cup member 8 which is affixed to the upper end of the tubular support 7. A conduit 9 communicates between the interior of the tubular support 7 and a squeeze bulb 9a.

FIG. 2 is a cross-sectional view of the device of FIG. 1 taken along section line 2—2 thereof. The tubular body portion 1 can be formed of plastic, lightweight metal, or other suitable material. In the embodiment chosen for illustration in FIG. 2, the tubular body portion is made of lightweight electrically conductive metal. However, the tubular body portion could be constructed of plastic, which would necessitate only appropriate changes in electrical circuitry since the plastic is nonconductive. The tubular body portion 1 is received in a base member 3 which forms a stand for the device. The base member 3 can be separately formed, as shown in FIG. 2, or formed integrally with the tubular body portion 1. The upper end of the tubular body portion is provided with threads 21 which engage the cap member 5, as shown.

The light source comprises the elements of a typical flashlight including a battery 22, positioning spring 23 which urges the battery upwardly into electrical contact with a lightbulb 24 which is received in a positioning bracket 25 threadingly engaging the cap member 5. The electrical circuit is completed by moving the switch 4 in the direction of the arrow 4a thereby making contact between the bracket 25 and the switch arm 26.

The cap member 5 is provided with an axial recess 27 which functions as a lens support well. A central aperture 28 communicates between the light source and the lens support well 27 permitting passage of light from the light bulb 24 into the lens support well 27. The tubular member 7 of the lens support is received in the lens support well 27 and extends upwardly therefrom, being urged upwardly by the pressure spring 29 disposed in the bottom of the lens support well 27.

In operation, the device is used to remove a lens from the wearer's eye as follows. The device of FIG. 2 is placed in a vertical position upon the stand 3 leaving the user's hands free, the light source is activated by manipulating the switch 4, the wearer positions the longitudinal axis (indicated by the dashed line 7b) of the lens support coincident with the optical axis of the eye and moves his head downwardly until the cup member 8 contacts the lens along the periphery thereof. Just prior to contact, the squeeze bulb 9a is collapsed such that after contact between the resilient cup member 8 and the lens, release of the squeeze bulb will cause a partial vacuum within the tubular member 7, holding the lens in contact with the resilient cup member 8 for removal from the eye.

When the device of FIGS. 1 and 2 is used to insert a contact lens into the eye of the wearer, the device is operated as follows. The lens, suitably coated with a lubricant commonly employed in the art, is placed upon the cup-shaped support 8 and the light switch 4 is manipulated to activate the light source within the device. With the device standing free upon a flat surface, such as a table or the like, the user's hands are free to retract the eyelids preparatory to inserting the lens. The user merely aligns the optical axis of his eye with the optical axis 7b (see FIG. 2) of the device and lowers his head until the lens contacts the eyeball, at which time the lens will naturally adhere to the eyeball and the wearer can, by lifting his head, disengage the lens from the cup-shaped support 8. If necessary, at this point, the squeeze bulb 9a can be depressed to further aid in disengaging the lens from the cup-shaped support 8.

FIGS. 3 and 4 illustrate in greater detail the elements of FIG. 2 which are employed when the device is used to remove a lens from the wearer's eye. The lower end of the tubular member 7 is dimensioned to be received in the lens support well 27 of the device of FIG. 2. The cup member 8 is formed of resilient material such as sponge rubber or other suitable materials which will readily occur to those skilled in the art. The lens contacting surface 8a of the cup member 8 is shaped to register with the convex surface of the contact lens. The lower end of the tubular member 7 is closed by a transparent plug 7a which permits passage of light therethrough and through the interior of the tubular member 7. When a lens is sealingly engaged along its peripheray with the surface 8a of the cup member 8, a closed chamber divided by the lens, the cup member 8, the tubular member 7 and the transparent plug 7a is formed. This chamber can be evacuated to provide a partial vacuum which maintains the sealing engagement between the lens and the surface 8a by releasing the previously collapsed squeeze bulb 9a which is connected by means of conduit 9 with the interior of the tubular member 7.

Finally, the schematic of FIG. 5 illustrates the alignment of the contact lens either just prior to removal or just prior to insertion of the lens into the wearer's eye. The wearer simply aligns the optical axis of the eye 61 with the optical axis of the lens 62 by observing light emanating in the direction of the arrow 63 from the light source (not shown).

Various minor and immaterial variations in the precise details of the device illustrated in the drawings will readily occur to those skilled in the art, having regard for the disclosure hereof. Such minor and immaterial variations are intended to be included within the scope of my invention, which is defined only by a just interpretation of the following claims.

Having fully described my invention and the presently preferred embodiments thereof.

I claim:

1. In an instrument for manipulating contact lenses comprising a tubular body portion having an upper end and a lower end, a light source disposed within said tubular member adapted to direct light upwardly therefrom, and hollow means for supporting a contact lens above said tubular member, whereby said light directed upwardly from said tubular member passes through said hollow lens supporting means and through the lens supported thereon, the improvements in combination therewith comprising
    (a) a cap member affixed to the upper end of said tubular member and having an axial lens support well therein, and a light transmitting aperture communicating between the light source in said tubular member and the lens support well, and
    (b) a lens support adapted to remove a contact lens from the eye including
        (1) a tubular support adapted to be inserted within said lens support well and extend upwardly therefrom, having an open upper end and a closed light transmitting lower end,
        (2) a resilient cup member affixed to the upper end of said tubular support and adapted to engage a contact lens along its periphery, said cup member having a central aperture communicating with the interior of said tubular support, and
        (3) means for creating a partial vacuum within said tubular support after a contact lens is sealingly engaged by the periphery of said cup member.

2. The improved instrument of claim 1 wherein said means for creating partial vacuum comprises a squeeze bulb and conduit means communicating between said squeeze bulb and the interior of said tubular support.

3. The improved instrument of claim 1 which includes a compression spring disposed in said lens support well and adapted to urge said lens support upwardly and compressible when said cup member engages a contact lens positioned on an eye.

References Cited by the Examiner

UNITED STATES PATENTS 3,129,971  4/1964  Kobler _____ 294—64
3,139,298  6/1964  Grabiel.

GERALD M. FORLENZA, *Primary Examiner.*

G. F. ABRAHAM, *Assistant Examiner.*